Patented Feb. 12, 1952

2,585,355

UNITED STATES PATENT OFFICE 2,585,355

METHOD OF INTRODUCING AN AMINO GROUP INTO AROMATIC COMPOUNDS

Józef Szczęsny Turski, Krynica, Poland

No Drawing. Application December 11, 1947, Serial No. 791,167. In Great Britain September 1, 1946

Section 1, Public Law 690, August 8, 1946
Patent expires September 1, 1966

5 Claims. (Cl. 260—262)

In the German Specification No. 287,756 I have described a process for introducing an amino group into an aromatic compound by treatment of the latter with hydroxylamine and sulphuric acid in the presence of an iron salt as catalyst. The amount of the catalyst employed in this process was, however, such that only one part of the catalyst was dissolved in the sulphuric acid, with the result that in some cases undesirable tarry reaction products were formed. This can probably be explained on the basis that the dissolved part of the iron salt acts as a homogeneous catalyst to promote the formation of the desired amino compound, while the undissolved part acts heterogeneously and in a different sense to promote undesired side reactions.

The British Specifications Nos. 204,241, 279,205, 280,652 and 348,159 described the introduction of amino groups into benzanthrone, dibenzanthrone and derivatives thereof by reaction with hydroxylamine in the presence of sulphuric acid, ferrous sulphate in some cases being used as a catalyst. Where used, however, the quantity of ferrous sulphate was, as in the case of German Specification No. 287,756, in excess of that which could be dissoved by the sulphuric acid.

According to the present invention, an amino group is introduced into an aromatic compound by reacting the aromatic compound with hydroxylamine, a salt thereof, or a salt of hydroxylamine disulphonic acid, or primary nitroparaffins, in the presence of sulphuric acid and, as catalyst, a metallic salt wholly dissolved in the sulphuric acid. By proceeding in this way, the yield of the desired amino compound is improved, and the tendency to undesired side reactions reduced. The salts of hydroxylamine disulphonic acid may be made by the well known Raschig reaction, i. e. in the case of the sodium salt by reacting sodium bisulphite with sodium nitrite in the presence of sulphur dioxide.

I have described in the U. S. Specification No. 2,401,525 the introduction of an amino group into aromatic compound by reacting the compound with a primary nitroparaffin in the presence of sulphuric acid and a catalyst, comprising a metallic salt wholly dissolved in the sulphuric acid.

In the case of all the above-mentioned specifications, however, the reaction temperature was above 120° C. and in most cases above 160–180° C. According to the present invention, greatly improved results are obtained by carrying out the reaction between the hydroxylamine, its salt, or the salt of hydroxylamine disulphonic acid or the primary nitroparaffins and the aromatic compound under conditions such that not only is the catalyst wholly dissolved in the sulphuric acid, but the reaction proceeds at a temperature not exceeding that obtainable in a water bath, for example not exceeding 100° C. By proceeding in this way, the following improved results are obtained:

a. An improved yield and less tendency to oxidising side reactions. As shown by Example I below, in which anthraquinone is reacted with hydroxylamine sulphate in the presence of a vanadium salt, the yield is substantially greater when the reaction is carried out at 100° C. than when the reaction is carried out at a higher temperature. At the higher temperature, even when the catalyst is wholly dissolved, there is a tendency for oxidation and sulphonation to occur. Thus in the case of the amination of naphthalene using a vanadium salt as catalyst, the resulting naphthylamine sulphonic acid is oxidised, almost quantitatively on prolonging heating, to a quinone-imine. These oxidising side-reactions are particularly marked in the case of anthracene and phenanthrene.

b. The reaction is more selective. Thus when benzene is aminated at a temperature of about 160° C. a mixture of metanilic acid, sulphanilic acid and ortho-aniline-sulphonic acid is obtained. At the temperature of the water bath, however, using vanadyl sulphonate as a catalyst, the resulting product is substantially pure metanilic acid, except a small quantity of phenylene-diamine-sulphonic acid. I have obtained, by aminating benzanthrone, a yield of amino-benzanthrone which is as high as 98.5–98.9% of the theoretical.

c. At the lower temperature there is a less tendency for the metal of the catalyst to be reduced in valence by reduction at the expense of part of the hydroxylamine.

d. It is possible to introduce an amino group into a wider range of aromatic compounds. Thus I can produce, with a yield above 70% of theoretical, amino-anthracene-sulphonic acid and amino-phenanthrene-sulphonic acids, which can be diazotized and coupled, such products not being obtainable when the reaction is carried out at the higher temperatures. I have also been able to introduce an amino group into aromatic nitrocompounds, without destruction of the nitro group, which takes place at the higher temperatures. Thus I have obtained amino derivations from nitro-anthraquinone and from nitroazo dyestuffs. Triphenylmethane and certain of the sulphur-dyes have also been successfully aminated at the temperature of the water bath. The strongly auxochromic nature of the amino group causes, in such cases, a change in colour of the dye towards black or brown and alters the dyeing properties.

e. It is also possible, in some cases, to introduce more than one amino-group when working at the lower temperature. Thus amination of anthrarufine (1,5 - dihydroxy - anthraquinone) gave a violet-blue mixture of polyamino-dihydroxyanthraquinones of mordant dyestuff nature. By previous sulphonation of the anthrarufine, dyestuffs of the acid dye character were obtained. Where mono-amination of anthraquinone derivatives is required, difficulty is sometimes encountered in preventing the introduction of a second amino group into another nucleus. This however can generally be prevented by appropriate selection of the time of the reaction and the nature of the catalyst.

The nature of the metallic salt employed as the catalyst plays a large part in determining whether or not the reaction can successfully be carried out on the water bath. I find that salts of the following metals can be used, viz. vanadium, molybdenum, titanium and iron. The salt used may contain the metal either in the anion or in the cation. Thus, as noted below, in the case of vanadium the salt may be vanadyl sulphate or ammonium vanadate. Again, by the expression "salt" I include compounds such as molybdenic acid, in which the metal is present in the cation. At the higher temperatures there is little difference between their effectiveness, but at 100° C. they differ widely, vanadium and molybdenum being the best, and the others being decreasingly effective in the above-named order, iron being of relatively little value. I find that salts of thorium, zirconium and mercury can be used in conjunction with salts of one or more of the four metals mentioned above, provided the whole of the metal salts employed are dissolved in the sulphuric acid. In this connection it should be noted that as the concentration of the sulphuric acid increases, the solubility of the catalysts, generally speaking, decreases.

The reaction can be stopped immediately when the whole of hydroxylamine, its salt or the salt of hydroxylamine-disulphonic acid has been used up, which can be ascertained by test. As the reaction takes place in clear solution, no stirring is necessary and there is no tendency for the liquid to overheat. The fact that stirring can be dispensed with cheapens the cost of manufacture of the amino compounds. If desired, however, the hydroxylamine can be added in small quantities to the other reagents, in which case stirring is advisable.

It is preferable to use a quantity of sulphuric acid which is about ten times by weight that of the aromatic compound. From Example I it will be seen that doubling the quantity of sulphuric acid improves the yield. The concentration of sulphuric acid also influences the direction of the reaction.

The following are examples of how the invention can be carried into effect:

*Example 1*

20.8 gms. of anthraquinone dissolved in 200 gms. of 93% sulfuric acid were mixed with 8.5 gms. of hydroxylamine sulphate (or the equivalent quantity of an alkali metal salt of hydroxylamine disulphonic acid or equivalent quantity of an alpha-nitro-paraffins) and 0.7 gm. vanadyl sulphate, ammonium vanadate or vanadium sulphate added.

Heating the same solution at 100° C. for 10 hours only on the water bath, 22.9% of anthraquinone was recovered and notwithstanding this at higher temperatures, the yield of beta-amino-anthraquinone was raised to 31.3% from 30% at the temperature 145–147° C.

Where 400 gms. of sulphuric acid were used in place of 200 gms., the solution was heated to 100° C. for 20 hours, 19.5% anthraquinone was recovered, and the yield of beta-amino anthraquinone was raised to 33.1%. If the sulphuric acid, after separation of recovered anthraquinone and beta-amino-anthraquinone is gradually diluted, the main remaining product was found to be mixture of alpha-amino-anthraquinone and diamino-anthraquinone with the amino groups in different nuclei, mainly in the 1,6- and 1,7- positions.

Repeating the first experiment, but using 0.6 gm. of ferrous sulphate in place of the vanadium salt, 72% anthraquinone was recovered and the yield of beta-amino-anthraquinone was only 10.5%.

Repeating the first experiment, but using as the catalyst 0.05 gm. molybdenic acid, 35% anthraquinone was recovered after 40 hours, the yield of beta-amino-anthraquinone being 21% and alpha-amino-anthraquinone 44%.

Repeating the first experiment, but using as the catalyst 0.5 gm. molybdenic acid, 32.5% anthraquinone was recovered after 15 hours, and the reaction product consisted of 25.5% beta-amino-anthraquinone, 42% alpha-amino-anthraquinone and some diamino-anthraquinone.

Repeating the first experiment, but using as the catalyst 1.25 gms. titanium dioxide, and increasing the quantity of hydroxylamine to 1.15 mols. per mol of anthraquinone, 27.7% anthraquinone was recovered and the yield was 21.2% beta-amino-anthraquinone and 44.3% alpha-amino-anthraquinone. When however the solution was heated for 20 hours at 165° C. the amount of anthraquinone recovered was 18%, and the yield was 18% of beta-amino-anthraquinone and 59.3% of alpha-amino-anthraquinone.

*Example 2*

When 7.8 gms. of benzene, 80 gms. of 94% sulphuric acid and 8.5 gms. of hydroxylamine sulphate (or the equivalent quantity of an alkali metal salt of hydroxylamine disulphonic acid or the equivalent quantity of an alpha-nitro-paraffins) and 0.08 gm. as the catalyst, and the solution was heated at 100° C. for 40 hours a 70 to 74% yield of metanilic acid was obtained, with none of the para or ortho-isomer and only a small quantity in traces of the easily separable phenylene-diamine-sulphonic acid.

When 12.8 gms. naphthalene were reacted with 130 gms. 93% sulphuric acid, 8.5 gms. of hydroxylamine sulphate (or the equivalent quantity of an alkali metal salt of hydroxylamine disulphonic acid or the equivalent quantity of an alpha-nitroparaffins) and 0.2 gm. of vanadium sulphate at 100° C. a 70% yield mixture of naphthylamine-sulphonic acids was obtained. When the reaction temperature was raised, however, these acids were gradually transformed into compounds of the quinono-imide type.

Reacting 17.8 gms. anthracene or phenanthrene with 180 gms. of 98% sulphuric acid, 8.5 gms. of hydroxylamine sulphate (or the equivalent quantity of an alpha-nitro-paraffins i. e.

nitromethane) and 0.2 gm. molybdenic acid for 80 hours at 100° C. gave the corresponding amino-sulphonic acid, in a form available for diazotization and coupling. The mixture of aminoanthracene-sulphonic acids resulting from the reaction can be separated by an 80% solution of alcohol in water. The yield exceeds 75% of the theoretical. At higher temperatures, the reaction product consisted mainly of undiazotizable products of quinonoid character.

*Example 3*

23 gms of the benzanthrone were dissolved in 230 gms. of 92% sulphuric acid which contained 0.23 gm. of dissolved vanadyl sulphate. The solution was heated for 40–45 hours on waterbath with 8.5 gms. hydroxylamine sulphate (or the equivalent quantity of a primary nitroparaffin i. e. alphanitro-propane). After purifying, by extraction, from free benzanthrone, the yield of amino-benzanthrone (M. P. 172–174° C.). This amino-benzanthrone fused with KOH at a temperature of about 240° C. gives a black dyestuff which dyed from the vat to give a cherry-bluish colour. If it is from nitropropane the propionic acid formed, these were extracted by means of the ethylacetate or ethyl propionate.

Benzophenone aminated in the same way gave a yield of about 74% of a mixture of aminobenzophenones, mainly meta-amino-benzophenone, and some of the para compound. Diazotized amino-benzophenone coupled with anilides of beta-hydroxy-naphthoic acid, gives orange to scarlet shades, very fast to weather and light.

*Example 4*

9.6 gms. alizarin dissolved in 100 gms. of 98% sulphuric acid containing 0.1 gm. of wholly dissolved vanadyl sulphate was heated for 40 hours on the water bath with 3.6 gms. hydroxylamine sulphate. After separation of unchanged alizarin, an 85% yield of mainly alpha-amino-alizarin was obtained.

Employing 1 gm. mol. anthrarufine previously sulphonated to the mono-sulphonic acid or disulphonic acid in a solution of 2400 gms. of sulphuric acid monohydrate with two gm. mol. of hydroxylamine sulphate in the presence of 0.1% vanadyl sulphate or other vanadium catalyst, a mixed product was obtained, giving a reddish blue acid dyestuff, or grey-bluish after chroming. Without sulphonation and with six mol. of hydroxylamine sulphate a mordant reddish-blue dyestuff was obtained after 100 hours of heating on the water bath.

*Example 5*

0.1 mol. of vat-dyestuff when dissolved in a tenfold amount of 98% sulphuric acid, containing 1% wholly dissolved vanadyl sulphate or molybdenic acid, in a proportion of 1% by weight of the dyestuff, and when heated for 40 hours on the waterbath with 0.52 or 1.05 or 2.1 mols. of hydroxylamine sulphate or alkali salts of hydroxylamine disulphonic acid or primary nitroparaffins, yielded aminated derivatives for example dibenzanthrone and iso-dibenzanthrone dyestuffs without sulphonated products. By using the appropriate amount of hydroxylamine compound the mono-, diamino- and poly-amino-dyestuffs were obtained, of which many possess full dyeing properties. Some of these products under the influence of chlorine water or hypochlorite change their shade into fast to chlorine often with very little change of shade. Thus aminating in this way:

| 1 mol. vat dyestuff | Quantity mol. $NH_2OH$ | Colour of the vat | Colour in exposure to air |
| --- | --- | --- | --- |
| Dibenzanthrone | 4 | violet-blue | green-black. |
| Isodibenzanthrone | 1 | blue | navy-blue. |
| Do | 2 | do | bluish-black. |
| Pyranthrone | 1 | cherry red | brown. |
| Do | 2 | do | earth-brown. |
| Flavanthrone | 1 | blue | olive. |
| Do | 2 | do | earth-grey. |
| Indanthrone | 2 | do | bluish grey. |
| Tetrabromindigo | 2 | yellow-brown | bluish-black. |

*Example 6*

16 gms. azobenzene dissolved in 180 gms. of 92% sulphuric acid containing in solution 0.2 gm. of vanadyl sulphate was heated for 30 hours with 8.5 gms. of hydroxylamine sulphate, or of the equivalent quantity of the primary nitroparaffins, or alkali metal salts of the hydroxylamine disulphonic acid. After separating a small quantity of unchanged azobenzene, about 85% of mixture of amino-azo-benzenes was obtained. The majority of benzidine azo-dyestuffs and many wollen acid dyestuffs aminated in the same way gain new dyeing properties. A dyestuff containing one nitro-group can be aminated in this way.

*Example 7*

1 gm. mol. of nitrobenzene dissolved in tenfold amount of sulphuric acid containing 0.1% molybdenic acid or vanadyl sulphate and 0.52 gm. mol. of hydroxylamine sulphate or of the equivalent quantity of an alkali metal salt of hydroxylamine disulphonic acid or of the equivalent quantity of the primary nitroparaffins was heated until the smell of nitrobenzene disappeared on the water bath at the temperature of 95–99° C. Ortho-nitroaniline and some nitro-diamino derivatives were obtained. In the same way nitronaphthalene and some of the nitrotoluene ortho and para and some of nitro-anisole and some of the nitro-anthraquinones and halogenated derivatives of aromatic compounds can be in this way aminated.

*Example 8*

1 gm. mol. dimethyl-aniline aminated, as last described, by means of 1.05 gm. mol. hydroxylamine compounds yielded about 75% of aminodimethyl-aniline, forming a brown azo-dyestuff with beta-naphthol. Diphenylamine and carbazole did not, however, react in this way, the former giving a product resembling indamine and the latter giving relatively little yield at the temperature of the water bath.

What I claim as my invention and desire to secure by Letters Patent is:

1. Method of forming aromatic amino compounds comprising reacting the aromatic compound at a temperature not exceeding approximately 100° C. with a molecularly equivalent quantity of an aminating agent selected from the group consisting of hydroxyl amine, hydroxyl amine salts, hydroxyl amine disulfonic acid, and primary nitro paraffins in a solution of concentrated sulfuric acid having completely dissolved therein a catalyst selected from the group consisting of sulfuric acid soluble salts of vanadium, molybdenum, titanium, zirconium, thorium, mercury, and iron and separating the aromatic amine from the reaction mixture.

2. Method of forming aromatic amino compounds comprising reacting an aromatic compound at a temperature not exceeding approximately 100° C. with a molecularly equivalent quantity of hydroxyl amine sulfate as the aminating agent in a solution of concentrated sulfuric acid having completely dissolved therein a catalyst selected from the group consisting of sulfuric acid soluble salts of vanadium, molybdenum, titanium, zirconium, thorium, mercury, and iron, and separating the aromatic amine formed from the reaction mixture.

3. Method of forming aromatic amino compounds comprising reacting an aromatic compound at a temperature not exceeding approximately 100° C. with a molecularly equivalent quantity of hydroxylamine disulfonic acid salt as the aminating agent in a solution of concentrated sulfuric acid having completely dissolved therein a catalyst selected from the group consisting of sulfuric acid soluble salts of vanadium, molybdenum, titanium, zirconium, thorium, mercury, and iron, and separating the aromatic amine formed from the reaction mixture.

4. Method of forming aromatic amino compounds comprising reacting an aromatic compound at a temperature not exceeding approximately 100° C. with a molecularly equivalent quantity of a primary nitro compound as the aminating agent in a solution of concentrated sulfuric acid having completely dissolved therein a catalyst selected from the group consisting of sulfuric acid soluble salts of vanadium, molybdenum, titanium, zirconium, thorium, mercury, and iron, and separating the aromatic amine formed from the reaction mixture.

5. The method of forming an amino derivative of a sulfonated aromatic compound comprising reacting a sulfonated aromatic compound at a temperature not exceeding 100° C. with a molecularly equivalent quantity of an aminating agent selected from the group consisting of hydroxyl amine, hydroxyl amine salts, hydroxyl amine disulfonic acid, and primary nitro paraffins in a solution of concentrated sulfuric acid having completely dissolved therein a catalyst selected from the group consisting of sulfonic acid soluble salts of vanadium, molybdenum, titanium, and iron, and separating the sulfonated aromatic amine from the reaction mixture.

JÓZEF SZCZĘSNY TURSKI.

REFERENCES CITED

The following references are of record in the file of this patent:

UNITED STATES PATENTS

| Number | Name | Date |
|---|---|---|
| 2,401,525 | Turski | June 4, 1946 |

FOREIGN PATENTS

| Number | Country | Date |
|---|---|---|
| 287,756 | Germany | July 14, 1914 |
| 564,610 | Great Britain | Oct. 5, 1944 |